Aug. 19, 1952  M. P. DAVIES  2,607,488
SIZER AND CLASSIFIER
Filed Nov. 22, 1949
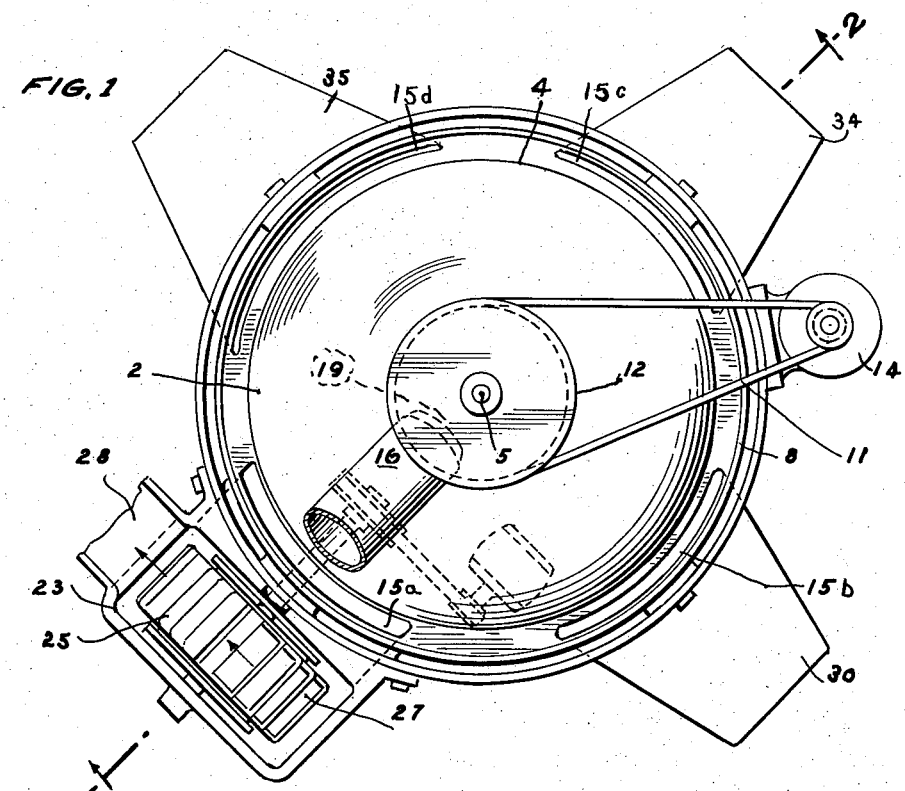
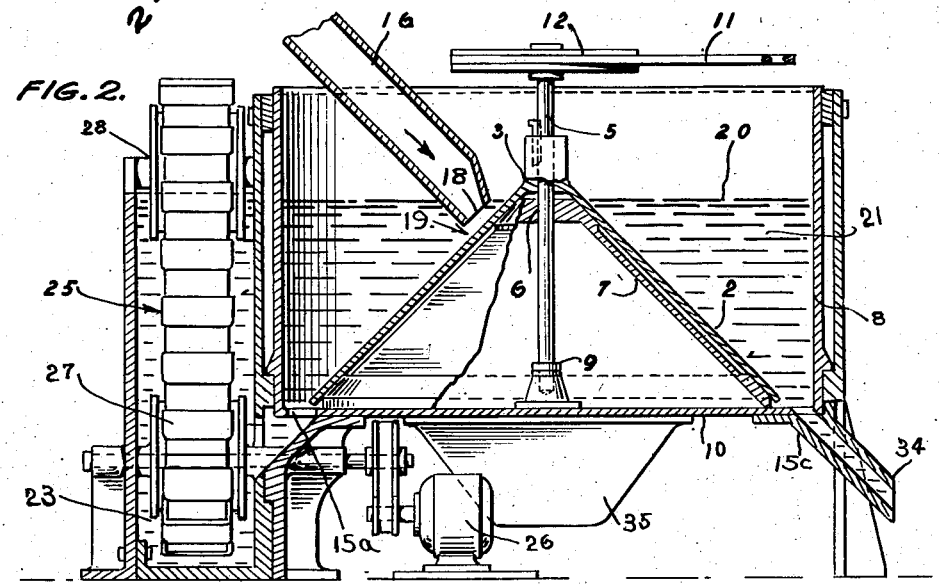
INVENTOR
M.P. DAVIES
BY Scott L. Nourill
ATTORNEY

UNITED STATES PATENT OFFICE 2,607,488

SIZER AND CLASSIFIER

Mearl P. Davies, Phoenix, Ariz.

Application November 22, 1949, Serial No. 128,867

3 Claims. (Cl. 209—208)

This invention concerns sizers and classifiers for comminuted materials.

One of the objects is to provide a rotor having a conical classifying surface, with means, in a round tank, so that materials introduced at a given position near its apex will be deposited according to size and weight within different annular spaces around the bottom of the tank;

Another object is to provide a rotating classifying cone with means for rotating under water in a tank which has a number of chutes or bins arranged around its lower peripheral rim to receive material of different sizes and weights as it rolls or slides off of said cone, together with means for removing classified material from said bins and chutes without commingling particles of said material.

I attain the foregoing objects by means of the apparatus and mechanism shown in the accompanying drawings in which—

Figure 1 is a plan view of a preferred form of device embodying my improvements; and Figure 2, is a section thereof taken on line 2—2, Figure 1.

Similar numerals refer to similar parts in all views.

The cone 2 is made of metal and has a smooth outside surface, which slants outward and downward from its apex 3 to the perimeter 4 of its base. The cone is mounted to turn on vertical shaft 5. Bearing 6 is in the raised portion 7 of tank 8, and a foot bearing 9 is in the bottom 10. A pulley wheel 12 is at the top of shaft 6 and is adapted to receive a belt 11 driven by motor 14 so as to rotate the cone steadily at a desired predetermined speed.

The bottom center 7 is raised to provide a mount for bearing 6, high enough to keep it out of grit that may accumulate in the bottom rim of the tank. Bearing 9 is enclosed within the raised bottom portion 7.

An annular flat bottomed channel is provided between the cone perimeter 4 and the wall of tank 8. Arcuate openings 15a, 15b, etc., are cut in the bottom of this channel to receive material running off cone 2 as it revolves.

A feed chute 16 is positioned above cone 2 and has an opening 18 arranged to deliver material to be classified within a definite area 19 near the apex 3. The material is carried along this chute by a flow of water, and both water and material enter the tank below the high water level 20 of water 21 contained in tank 8.

A bin 23 is disposed on the outside of tank 8, radially about opposite to the area 19. This bin extends below the tank bottom 10 and outward from the wall a sufficient distance to receive a bucket line belt 25. This is driven by motor 26. The rim of bin 23 approximates that of tank 8 and the water level 20 is maintained in the bin at the same level as in the tank.

Opening 15a connects bin 23 to tank 8 to receive coarse material from cone 2. It is removed as it accumulates in the buckets 27 of bucket line 25, and deposited in a hopper 28. The bottoms of the buckets can be perforated, as at 29, so that water drains from them as they raise the material from the bin.

Next to this bin the annular rim portion of the tank bottom is provided with an arcuate opening 15b, which leads to a chute 30. Further around the tank other arcuate slots 15c and 15d lead to chutes 34 and 35, respectively.

Water is fed into tank, along with the material to be worked, at a rate to maintain the level at a position indicated by line 20. Little water is removed by bucket line 25, and the openings 15b, 15c, and 15d are sized to remove the water as fast as it runs in. Obviously an overflow spout indicated by dotted outline 32, can be provided if the supply entering through chute 16 is apt to be in excess. The fine particles are removed from the tank by the outflowing water issuing from the several chutes 30, 34 and 35. This action of the water prevents these finer and lighter particles from packing in the bottom of the tank. They are carried out as fast as they accumulate. Since, as a rule, the larger particles comprise the greater bulk of any given mass of material, arcuate opening 15a is made much larger than the other openings. This depends, in turn, on the nature of the material. Opening 15a would therefore allow too much water to escape and therefore bin 23 is used to retain the water and the removal is then made mechanically by bucket line 25.

Separation of mixtures of various sizes of particles has heretofore been tried by making use of moving inclined planes. Probably the most convenient form of such an inclined plane is the outer surface of a revolving cone. But difficulty has, heretofore, been encountered in separating the larger particles, which constitute the bulk of the material, without disturbing the separation of the fines. The larger particles rolled off the conical surface so rapidly that some of the finer particles would be carried with the larger ones and not allowed to attain their normal rate of downward travel. Various means have been resorted to to slow up the larger particles. These means did not succeed because new problems of handling were introduced. The simple means I have here shown, accomplished the result desired and the use of the bin and bucket line for removing larger pieces, and water for removing the fines overcomes many problems heretofore existing.

Separation here is made under water. The particles are detained on cone 2, after being deposited, not only by surface friction, and resistance to rolling, but by resistance of the water to particles passing through it. The weight of water displaced also has the effect of diminishing the weight of the particles and slowing their rate of descent. The cone may therefore be rotated more slowly to secure effective separation and the effect of centrifugal force minimized.

When aggregates or gravels are introduced any binding silt or adobe is at once softened and all clods or caked portions broken up at once.

The mechanism therefore not only classifies and grades the aggregates, but acts as a washer also. Silt or other fine solids will flow out with the discharge through the several chutes. The graded gravels delivered will therefore be washed.

In addition to this advantage the classifier operates without creating dust and with only a small amount of noise. This eliminates two undesirable features of trommels and shaper screens.

Since modification of the specific mechanism shown can be made, I wish to be limited by the claims.

I claim:

1. A sizer and classifier for comminuted materials comprising in combination: a cylindrical tank having a round bottom and upstanding walls; a cone journalled on a vertical shaft revolvable therein; a feed chute adapted to deposit comminuted materials near the top of said cone together with sufficient water to maintain a water level in said tank at approximately the height of said cone; an annular bottom area adjacent the walls thereof adapted to receive material from the lower rim of said cone; and chutes connected to openings arranged at intervals around this annular area to receive and remove materials from predetermined arcuate portions of said annular area, and a tank connected in water tight relation with one of said chutes positioned radially outward from said feed chute, having its bottom below said tank so that said materials will flow thereinto and its rim in the same plane as said tank so as to maintain a water level therein substantially the same as in said tank, and means for removing material therefrom, includign a conveyor operating from the bottom thereof to a position above the rim thereof.

2. A sizer and classifier for comminuted materials comprising in combination, a cylindrical tank having cylindrical side walls and a round bottom with a centrally positioned, raised portion and an annular area surrounding this raised portion; arcuate openings spaced at intervals around said annular area; a bin positioned on the outside of said tank and attached to the side wall havening its bottom below that of said tank and its top edge in the same horizontal plane as that of said tank, connected to said tank through one of said arcuate openings; a bucket line conveyor operative in said bin to remove material from the bottom thereof; chutes of restricted discharge area connected to the other arcuate openings in said tank bottom; a rotating cone supported on a centrally disposed vertical shaft journaled in the raised portion of said tank; a motor connected to said vertical shaft adapted to rotate said cone at a predetermined speed; a feed chute adapted to deposit material to be classified on the upper portion of said cone at a position substantially alined radially with the arcuate opening connected to said bin; and means for maintaining water in said tank at a level approximating the top of said cone.

3. A sizer and classifier for comminuted materials comprising in combination, a cylindrical tank having cylindrical side walls and a round bottom with a centrally positioned, raised portion and an annular area surrounding this raised portion; arcuate openings spaced at intervals around said annular area; a bin positioned on the outside of said tank and attached to the side wall thereof having its bottom below that of said tank and its top edge in the same horizontal plane as that of said tank, connected to said tank through one of said arcuate openings; a bucket line conveyor operative in said bin to remove material from the bottom thereof; chutes of restricted discharge area connected to the other arcuate openings in said tank bottom; a rotating cone supported on a centrally disposed vertical shaft journaled in the raised portion of said tank; a motor connected to said vertical shaft adapted to rotate said cone at a predetermined speed; a feed chute adapted to deposit material to be classified on the upper portion of said cone at a position substantially alined radially with the arcuate opening connected to said bin together with sufficient water so that a water level will be maintained in said tank and bin at approximately the height of the top of said cone.

MEARL P. DAVIES.

REFERENCES CITED

The following references are of record in the file of this patent:

UNITED STATES PATENTS

| Number | Name | Date |
|---|---|---|
| 705,104 | Longan | July 22, 1902 |
| 951,964 | McKinlay | Mar. 15, 1910 |
| 1,119,662 | Sutton | Dec. 1, 1914 |
| 1,291,278 | Ulrich | Jan. 14, 1919 |
| 1,812,365 | Peale | June 30, 1931 |

FOREIGN PATENTS

| Number | Country | Date |
|---|---|---|
| 4,962 of 1926 | Australia | Nov. 29, 1926 |